United States Patent [19]

Secrist et al.

[11] Patent Number: 4,541,912

[45] Date of Patent: Sep. 17, 1985

[54] CERMET ELECTRODE ASSEMBLY

[75] Inventors: Duane R. Secrist, Elizabethton; James M. Clark, Johnson City, both of Tenn.; Thomas E. Landon, Simpsonville, S.C.

[73] Assignee: Great Lakes Carbon Corporation, New York, N.Y.

[21] Appl. No.: 560,456

[22] Filed: Dec. 12, 1983

[51] Int. Cl.[4] .................... C25B 11/02; C25B 11/04; C04B 35/00; B29F 5/00
[52] U.S. Cl. ............................... 204/290 R; 204/291; 264/104; 264/125; 264/332
[58] Field of Search .................. 204/291, 290 R, 280, 204/286; 264/104, 125, 332

[56] References Cited

U.S. PATENT DOCUMENTS

| | | | |
|---|---|---|---|
| 3,829,374 | 8/1974 | Kugler et al. | 204/290 R |
| 3,960,678 | 6/1976 | Alder | 204/67 |
| 4,111,765 | 9/1978 | DeNora et al. | 204/67 |
| 4,173,518 | 11/1979 | Yamada et al. | 204/67 |
| 4,187,155 | 2/1980 | DeNora et al. | 204/67 |
| 4,354,918 | 10/1982 | Boxall et al. | 204/286 |
| 4,370,216 | 1/1983 | Spangenberg et al. | 204/243 R |

*Primary Examiner*—Donald R. Valentine
*Attorney, Agent, or Firm*—Adrian J. Good

[57] ABSTRACT

A cermet electrode assembly for use in an electrolytic cell is produced by the process of hot isostatic molding a cermet material onto a metal current member. The electrode assembly has long service life and can be joined to an electrical current source by conventional metal joining techniques.

6 Claims, No Drawings

CERMET ELECTRODE ASSEMBLY

BACKGROUND OF THE INVENTION

1. Field of the Invention

The invention relates to improved cermet electrodes and to a method for preparing such electrodes. The invention has specific application in the production of anodes for the electrowinning of aluminum in Hall-Heroult cells.

2. Description of the Prior Art

Electrolysis cells, such as a Hall-Heroult cell for aluminum production by the electrolysis of alumina in molten cryolite, conventionally employ conductive carbon electrodes. During the reaction to manufacture aluminum metal, the carbon anode is consumed at the rate of approximately 450 kg/mT of aluminum produced under the overall reaction

$$2Al_2O_3 + 3C \xrightarrow[Na_3AlF_6]{940°-1000° C.} 4Al + 3CO_2.$$

The problems caused by the use of carbon anodes are related to the cost of the anode consumed in the above reaction and to the impurities introduced to the melt from the carbon source. The petroleum cokes used in the fabrication of the anodes generally have significant quantities of impurities, principally sulfur, silicon, vanadium, titanium, iron and nickel. Sulfur is oxidized to its oxides, causing troublesome workplace and environmental pollution problems. The metals, particularly vanadium, are undesirable as contaminants in the aluminum metal produced. Removal of excess quantities of the impurities requires extra and costly steps when high purity aluminum is to be produced.

If no carbon were consumed in the reduction the overall reaction would be $2Al_2O_3 \rightarrow 4Al + 3O_2$ and the oxygen produced could theoretically be recovered. More importantly, with no carbon consumed at the anode there would be no contamination of the atmosphere or the product from the impurities present in the coke.

Attempts have been made in the past to use non-consumable electrodes with little apparent success. Metals either melt at the temperature of operation, or are attacked by oxygen or by the cryolite bath. Ceramic compounds such as oxides with perovskite and spinel crystal structures usually have too high electrical resistance or are attacked by the cryolite bath. Electrodes consisting of metals coated with ceramics using conventional methods such as thermal spraying have also shown poor performance, in that almost inevitably, even the smallest crack leads to attack on the metal substrate by the molten salt bath.

Recently, efforts have been made to fabricate non-consumable electrodes from special compositions known as cermets. A cermet composition is defined as one consisting of both metallic and ceramic phases. The conventional method of preparing cermet compositions is to mix metal and ceramic powders, cold press a preform, and sinter the preform at an elevated temperature in a controlled atmosphere. Alternatively, the cermet may be prepared by hot pressing or hot isostatic pressing (HIP) wherein the sintering operation is carried out under pressure. Cermets have high electrical conductivity in comparison to ceramic compositions and good corrosion resistance when compared to metals.

U.S. Pat. No. 4,374,050 to Ray provides a non-consumable electrode for molten salt electrolysis fabricated from at least two metals or metal compounds combined to provide a combination metal compound containing at least one of the group consisting of oxide, fluoride, nitride, sulfide, carbide or boride, the combination metal compound defined by the formula:

$$\left\{ \sum_{i=1}^{m} (M_i)F_{M_i} \right\} \left( \sum_{j=1}^{p} (M_j)F'_{M_j} \sum_{i=1}^{m} (M_i)F'_{M_i} \right)_Z \left( \sum_{r=1}^{n} X_r F_{x_r} \right)_K$$

where $\sum_{i=1}^{m} F_{M_i} = 1; \sum_{j=1}^{p} F_{M_j} + \sum_{i=1}^{m} F_{M_i} = 1$ and $$\sum_{r=1}^{n} X_r F_{x_r} = 1;$$

where Z is a number in the range of 1.0 to 2.2; K is a number in the range of 2.0 to 4.4; $M_i$ is at least one metal having a valence of 1, 2, 3, 4 or 5 and is the same metal or metals wherever $M_i$ is used in the composition; $M_j$ is a metal having a valence of 2, 3 or 4; $X_r$ is at least one of the elements from the group consisting of O, F, N, S, C and B; m, p and n are the number components which comprise $M_i$, $M_j$ and $X_r$; $F_{M_i}$, $F'_{M_i}$, $F'_{M_j}$ or $F_{x_r}$ are the mole fractions of $M_i$, $M_j$ and $X_r$ and $0 < \Sigma F'_{M_i} < 1$.

U.S. Pat. No. 4,374,761—Ray relates to non-consumable electrodes for molten salt electrolysis comprised of a ceramic oxide composition and at least one metal powder dispersed through the ceramic oxide composition for purposes of increasing its conductivity, the metal powder selected from the group consisting of Ni, Cu, Co, Pt, Rh, In and Ir.

U.S. Pat. No. 4,397,729 to Duruz et al. discloses a non-consumable anode for molten salt electrolysis consisting of a cermet material formed from a ceramic oxide of, e.g., a ferrite or chromite, and a metal, e.g., a noble metal or alloy thereof.

U.K. Pat. Appln. No. 2,069,529A to Duruz et al. provides a non-consumable anode for molten salt electrolysis consisting of a cermet material comprising at least one ceramic oxide such as chromite or ferrite of iron or nickel or ferric or chromic oxide and at least one metal such as nickel or chromium or a noble metal, e.g., palladium, or an alloy of such metals.

One of the problems arising in the development of conductive ceramic and cermet electrodes has been caused by the difficulty of making a durable electrical connection between the electrode material and the current conductor. Previous efforts in the field have produced connectors, primarily of metals such as silver, copper, and stainless steel. Can, U.S. Pat. No. 3,681,506, discloses a resilient metal washer held in place to form an electrical connection. Davies, U.S. Pat. No. 3,893,821, discloses a contact material containing Ag, La, $SrCrO_3$ and CdO. Douglas et al., U.S. Pat. No. 3,922,236, disclose a contact material containing Ag, Cu, La, and $SrCrO_3$. Fletcher, U.S. Pat. No. 3,990,860, discloses cermet compositions containing stainless steel or Mo in a matrix of $Cr_2O_3$ and $Al_2O_3$. Shida et al., U.S. Pat. No. 4,141,727, disclose contacts of Ag, $Bi_2O_3$, $SnO_2$ and Sn. Schirnig et al., U.S. Pat. No. 4,247,381 disclose an electrode useful for $AlCl_3$ electrolysis comprising a graphite pipe, a metallic conductor with a melting point below the bath temperature, and a protective ceramic pipe surrounding the former. West German No. 1,244,343, discloses borides or carbides of Ti, Zr, Ta, or Nb cast to Al using a flux of $Li_3AlF_6$, $Na_3AlF_6$ and NaCl. Alder, U.S. Pat. No. 4,357,226, discloses an anode assembly for a Hall cell comprising individual units mechanically held together by a clamping arrangement.

Pending U.S. patent application Ser. No. 475,951 to Secrist et al., now U.S. Pat. No. 4,443,314, relates to an improved anode assembly for an aluminum electrolysis cell formed by the process of shaping an anode and a cermet connector from powders, machining the articles, and then sintering the articles. The cermet connector mates with the anode via a threaded joint located at its region of high temperature during operation thereof to avoid excessive ohmic losses. Mechanical support can be provided by the threaded joint or through the use of separate mechanical suspension bars.

Pending U.S. patent application Ser. No. 491,089 to Secrist et al., now U.S. Pat. No. 4,472,258 provides an electrode for an electrochemical cell comprising a variable cermet composition, the portion in contact with the electrolyte having a relatively high ceramic content for maximum corrosion resistance and the portion attached to the external electrical circuit having a relatively high metal content to facilitate an electrical connection. Preferred metals are Ni, Cu, Fe, and Cr; and preferred ceramics are ferrites.

SUMMARY OF THE INVENTION

Our invention is a cermet electrode assembly for use in an electrolytic cell formed by hot isostatic pressing an appropriate cermet material onto a conductive metallic substrate which during electrode operation acts as a current distributor to the working electrode material and which can be joined to the electrical circuit (power supply) via conventional metal joining techniques. The cermet portion of the electrode is impervious and may be applied as a layer up to several inches in thickness to provide long service life. The electrode is useful in electrolytic processes ranging from aqueous electrolysis to the electrowinning of metals from molten salts.

The method of forming the cermet electrode assembly comprises cold isostatic molding of at least one layer of cermet material to be exposed to the bath of the electrolytic cell onto a portion of a metal current conducting member, encapsulation of the complete molded assembly in a sealed container or "can" (metal or glass), and hot isostatic pressing of the canned assembly for a specified period of time at the required temperature and pressure. In this process the cermet material is sintered to high density by the simultaneous application of heat and pressure and, in addition, is diffusion bonded to the metal current conducting member. In some cases, it may be advantageous to coat the metal current conducting member beforehand with a thin layer, e.g., 0.25 mm or less, of an appropriate metal such that during the heat treatment step alloying takes place between the metal constituent of the cermet and the coated current member. Likewise, it has been observed in our laboratory that the integrity of the electrode can be improved by forming the electrode via successive pressing of at least two layers of cermet material, the innermost layer in contact with the current member having a higher metal content to render it more compatible with the current member, i.e., to improve the diffusion bond and thermal expansion match, and the outermost layer in contact with the electrolyte having a lower metal content optimized for the electrolytic process. In this approach, the layers are formed by multiple cold pressing prior to the electrode being canned and hot isostatically pressed.

The electrode assembly of the invention can be fabricated into complex shapes of solid or hollow design, being subject to about the same limitations in this regard as conventionally processed ceramic pieces. Canning of complex shapes is accomplished by spraying the assembly prior to heat treatment with glass frit which flows at the glass softening point to produce a deformable sealed container. The processing time required for an electrode formed by the HIP process described is much shorter than that required for conventional sintering because the electrode is subjected to high pressure for most, if not all, of the process cycle enabling high heating and cooling rates to be used.

Our electrodes may have many other applications in addition to that in the Hall-Heroult cell, as in the production of the electrolytic elements and compounds, e.g., Mg, Cu, Zn, Na, Cl, NaOH, Ag, Au, and Pt are produced or refined electrolytically. Our electrodes may also be useful in fuel cells for the conversion of chemical to electrical potential. These cells have electrode requirements similar to those of molten salt electrolytic cells, namely, the electrodes must possess adequate corrosion resistance, electrical conductivity, and connectibility.

The electrode assembly of our invention, when used as an anode in a Hall-Heroult cell, comprises a cermet material with a ceramic oxide phase which may be one or more of the metal oxides which have previously been disclosed in the prior art for non-consumable anodes and a metal phase consisting of Ni, Cu, Fe, Cr or mixtures thereof. The current member may be any metal or metal alloy which can be diffusion bonded to, and is compatible with, the cermet material; preferred metals and alloys are Ni, Cu-Ni alloys, Monels, Inconels, and stainless steels. When the electrode assembly is employed in other applications, the selection of the cermet and current member materials is dictated by the specific requirements of the application.

DESCRIPTION OF THE PREFERRED EMBODIMENT

Examples 1 and 2 below will further describe our invention. These particular electrode assemblies are useful as anodes in the Hall-Heroult process for making aluminum. It is understood that the examples are provided to illustrate the practice of the invention and not intended as limiting beyond the limitations imposed by the appended claims.

EXAMPLE 1

A cermet material consisting of 40 vol. % Ni and 60 vol. % MnZn ferrite was prepared as follows: ceramic powders of $Fe_2O_3$, $MnCO_3$, and ZnO were mixed by wet milling, dried, and then calcined in air at 1000° C. for 2 hours to yield a ferrite composition corresponding to approximately 52 mole % $Fe_2O_3$, 25 mole % MnO, and 23 mole % ZnO. The appropriate quantity of Ni metal powder ($\leq 40$ micron particle size) was dry blended with the ferrite powder for one hour to produce the cermet powder precursor.

The cermet powder was cold isostatically molded at 413 MPa (60,000 psi) onto the lower 2" of a Monel 400 rod measuring 0.75" in diameter by 3" in length. The powder formed a cylindrical cup about the rod. This assembly was then sealed in an evacuated glass tube with a layer of inert BN powder surrounding the assembly to prevent it from reacting with the glass. The canned assembly was heated at a rate of 100° C. per hour until the flow point of the glass was attained, at which time a pressure of 207 MPa (30,000 psi) was applied and the upheat rate increased to 20° C. per minute until the sintering temperature, 1150° C., was reached. This temperature and pressure were maintained for one hour followed by rapid cooling under pressure at 20° C. per minute. Examination of the final electrode assembly showed that the 0.25" thick cermet layer was dense, adherent and free of cracks. The exposed portion of the Monel rod provided a site for conveniently attaching a source of current to the electrode assembly by conventional means, e.g., welding. Sectioning of the electrode assembly showed that a continuous diffusion bond was formed across its original cermet material/Monel interface. The density of the cermet material was determined to be >99% of theoretical.

EXAMPLE 2

An electrode assembly containing two cermet layers with different metal contents may be fabricated as follows:

A first cermet material, 40 vol. % Ni/60 vol. % MnZn ferrite is cold isostatically molded onto the lower portion of a Monel 400 rod by partially inserting the rod into a cylindrical mold, filling the mold with the cermet powder such that it completely surrounds the lower portion of the rod, and pressing the powder onto the rod at a pressure of 345 MPa (50,000 psi). The workpiece is then inserted into a larger mold and a second cermet material optimized for the Hall-Heroult electrolysis process, 16 vol. % Ni/84 vol. % MnZn ferrite, placed about the workpiece to fill the mold. The assembly is isostatically pressed a second time at a higher pressure of 413 MPa (60,000 psi) to yield an electrode preform comprising a metal current member and two distinct cermet layers. Canning and hot isostatic pressing of the preform is carried out as described in Example 1. The sintered electrode is characterized by high integrity, showing no evidence of external structural flaws, and a site is provided on the Monel rod for connecting a source of current by conventional means.

While the invention has been described in detail and with reference to specific embodiments thereof, it will be apparent to one skilled in the art that various changes and modification can be made therein without departing from the scope and spirit thereof, and, therefore, the invention is not intended to be limited except as indicated in the appended claims.

What is claimed is:

1. A cermet electrode assembly for use in an electrolytic cell produced by the process comprising cold isostatic molding a layer of cermet material to be exposed to the bath of the electrolytic cell onto a portion of a metal current conducting member followed by hot isostatic pressing the molded assembly in an essentially oxygen-free atmosphere at a temperature and pressure sufficient to sinter said cermet material and to bond said cermet material to said current conducting member.

2. The cermet electrode assembly of claim 1 wherein the portion of the current conducting member onto which the cermet material is to be applied is coated, prior to the cold isostatic molding procedure, with a thin layer of a metal capable of alloying with said current conducting member and said cermet material.

3. The cermet electrode assembly of claim 1 consisting of at least two layers of cermet material, wherein the innermost layer in contact with said current conducting member has a higher metal content than the outermost layer, which will be in contact with the electrolytic bath.

4. The cermet electrode assembly of claim 1 wherein the cermet material has a ceramic oxide phase and a metal phase selected from the group consisting of Ni, Cu, Fe, Cr, and mixtures thereof.

5. The cermet electrode assembly of claim 4 wherein the current conducting member is selected from the group consisting of Ni, Cu-Ni alloys, Monels, Inconels and stainless steels.

6. A cermet anode assembly for use in a Hall-Heroult cell produced by the process comprising cold isostatic molding a first layer of 40 vol. % Ni/60 vol. % MnZn ferrite cermet material onto a portion of a Monel current conducting member, cold isostatic molding a second layer of 16 vol. % Ni/84 vol. % MnZn ferrite cermet material over said first layer, and hot isostatic pressing the molding in an essentially oxygen-free atmosphere at a temperature and pressure sufficient to sinter said cermet materials and to bond said cermet materials to said current conducting member.

* * * * *